US012729331B2

(12) United States Patent
Gotou et al.

(10) Patent No.: US 12,729,331 B2
(45) Date of Patent: Sep. 8, 2026

(54) COMPOSITION CONTAINING REFRIGERANT, AND METHOD FOR STABILIZING COMPOSITION CONTAINING REFRIGERANT

(71) Applicant: DAIKIN INDUSTRIES, LTD., Osaka (JP)

(72) Inventors: Tomoyuki Gotou, Osaka (JP); Takashi Yoshimura, Osaka (JP); Takashi Usui, Osaka (JP); Yuuko Ito, Osaka (JP); Yuka Watanabe, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 663 days.

(21) Appl. No.: 18/132,017

(22) Filed: Apr. 7, 2023

(65) Prior Publication Data

US 2023/0265329 A1 Aug. 24, 2023

Related U.S. Application Data

(63) Continuation of application No. PCT/JP2021/037079, filed on Oct. 7, 2021.

(30) Foreign Application Priority Data

Oct. 9, 2020 (JP) ................................ 2020-171463

(51) Int. Cl.
*C09K 5/04* (2006.01)

(52) U.S. Cl.
CPC ........ *C09K 5/045* (2013.01); *C09K 2205/126* (2013.01); *C09K 2205/128* (2013.01); *C09K 2205/22* (2013.01)

(58) Field of Classification Search
CPC ................ C09K 5/045; C09K 2205/22; C09K 2205/126; C09K 2205/128
USPC ..................................................... 252/68, 67
See application file for complete search history.

(56) References Cited

U.S. PATENT DOCUMENTS

| | | | | |
|---|---|---|---|---|
| 2016/0230059 | A1 | 8/2016 | Takahashi et al. | |
| 2017/0362483 | A1 | 12/2017 | Feiring et al. | |
| 2020/0231853 | A1 * | 7/2020 | Borba | C09K 5/04 |
| 2020/0309437 | A1 | 10/2020 | Kumakura et al. | |

FOREIGN PATENT DOCUMENTS

| | | | |
|---|---|---|---|
| JP | 2011-220594 | 11/2011 | |
| JP | 2016-216477 | 12/2016 | |
| WO | WO-2019123898 A1 * | 6/2019 | F25B 49/022 |
| WO | 2020/017522 | 1/2020 | |

OTHER PUBLICATIONS

Abe et al, WO 2019123898 Machine Translation, Jun. 27, 2019 (Year: 2019).*
International Preliminary Report on Patentability issued Mar. 28, 2023 in International (PCT) Patent Application No. PCT/JP2021/037079.
International Search Report issued Nov. 9, 2021 in International (PCT) Application No. PCT/JP2021/037079.
Extended European Search Report issued Mar. 5, 2024 in corresponding European Patent Application No. 21877687.0.

* cited by examiner

*Primary Examiner* — Jessica Whiteley
(74) *Attorney, Agent, or Firm* — Wenderoth, Lind & Ponack, L.L.P.

(57) ABSTRACT

An object of the present disclosure is to provide a composition having excellent stability of a refrigerant. Provided is a composition comprising a refrigerant and carbon, the refrigerant comprising at least one member selected from the group consisting of HFO-1234yf, HFO-1132(E/Z), HFO-1132a, HFO-1123, and FO-1114.

7 Claims, No Drawings

COMPOSITION CONTAINING REFRIGERANT, AND METHOD FOR STABILIZING COMPOSITION CONTAINING REFRIGERANT

TECHNICAL FIELD

The present disclosure relates to a composition comprising a refrigerant and a method for stabilizing a composition comprising a refrigerant.

BACKGROUND ART

Patent Literature (PTL) 1 discloses a refrigeration cycle comprising an electric compressor, a condenser, an expansion valve, and an evaporator, as well as a circulation path that communicates with these components, wherein, in the refrigeration cycle, a refrigerant, such as 2,3,3,3-tetrafluoropropene (HFO-1234yf), and a lubricating oil are circulated in the circulation path, wherein the circulation path comprises an acid-neutralizing adsorber provided with a neutralizer that neutralizes an acid generated in the circulation path and an adsorbent that adsorbs moisture, and wherein the adsorbent for use is zeolite, activated carbon, alumina, or silica gel.

CITATION LIST

Patent Literature

PTL 1: JP2011-220594A

SUMMARY

The present disclosure includes the embodiments described in the following Items.

Item 1.

A composition comprising a refrigerant and carbon, the refrigerant comprising at least one compound represented by a molecular formula containing at least one carbon-carbon unsaturated bond.

Advantageous Effects of Invention

The composition according to the present disclosure has excellent stability of a refrigerant.

DESCRIPTION OF EMBODIMENTS

The present inventors conducted extensive research to improve the stability of a refrigerant, and found that the object can be achieved when at least one component selected from the group consisting of HFO-1234yf, HFO-1132(E/Z), HFO-1132a, HFO-1123, and FO-1114 as a refrigerant is present together with carbon.

The inventors found that the stability of a refrigerant is further improved by allowing carbon to be present together when a composition contains water.

Below, embodiments encompassed by the present disclosure will be described in detail.

Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given.

Refrigerants are broadly divided into fluorocarbon compounds and non-fluorocarbon compounds in teams of the structure of the compounds. Fluorocarbon compounds include hydrochlorofluorocarbons (HCFC) and hydrofluorocarbons (HFC). Non-fluorocarbon compounds include propane (R290), propylene (R1270), butane (R600), isobutane (R600a), and the like.

In the present specification, the phrase "composition comprising a refrigerant" at least includes (1) a refrigerant itself (including a mixture of refrigerants (refrigerant mixtures)), (2) a composition that further comprises other components and that can be mixed with at least a refrigeration oil to obtain a working fluid for a refrigerating machine, and (3) a working fluid for a refrigerating machine containing a refrigeration oil (refrigeration working fluid).

In the present specification, of these three embodiments, the composition (2) is referred to as a "refrigerant composition" so as to distinguish it from a refrigerant itself (including a mixture of refrigerants).

Further, in the present specification, the working fluid for a refrigerating machine (3) is referred to as a "refrigeration oil-containing working fluid" (working fluid containing refrigeration oil) so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment.

In other words, this type of alternative means that the same equipment is operated with an alternative refrigerant. Embodiments of this type of "alternative" include drop-in alternatives, nearly drop-in alternatives, and retrofits, in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" (refrigerator) refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, the terms "comprise," "contain," and "include" encompass the concepts of containing, including, consisting essentially of, and consisting cf.

In the present specification, when a numerical range is stated in steps, the upper-limit value or the lower-limit value of one numerical range can be randomly combined with the upper-limit value or the lower-limit value of another numerical range.

In the present specification, the upper-limit values or the lower-limit values of the numerical ranges stated in the present specification may be replaced with a value shown in the Examples or a value that can be unambiguously derived from the Examples.

In the present specification, the following terms are as described below.

2,3,3,3-Tetrafluoropropene: HFO-1234yf

Trans-1,2-difluoroethylene: HFO-1132(E) ((E)-1,2-difluoroethylene)

Cis-1,2-difluoroethylene: HFO-1132(Z) ((Z)-1,2-difluoroethylene)

(E) and/or (Z)-1,2-difluoroethylene: HFO-1132(E/Z)

The expression "(E/Z)" means that the E (trans) and/or Z (cis) forms are included.

1,1-Difluoroethylene: HFO-1132a

Trifluoroethylene: HFO-1123

Tetrafluoroethylene: FO-1114

[1] Composition (1) Refrigerant

The composition according to the present disclosure comprises a refrigerant and carbon, the refrigerant comprising at least one compound represented by a molecular formula containing at least one carbon-carbon unsaturated bond.

In the composition according to the present disclosure, the refrigerant is preferably at least one component selected from the group consisting of 2,3,3,3-tetrafluoropropene (HFO-1234yf), trans-1,2-difluoroethylene (HFO-1132(E)), cis-1,2-difluoroethylene (HFO-1132(Z)) (the trans and/or cis forms are collectively referred to as "HFO-1132(E/Z)"), 1,1-difluoroethylene (HFO-1132a), trifluoroethylene (HFO-1123), and tetrafluoroethylene (FO-1114).

In the present disclosure, the method for producing a refrigerant to be contained in the composition according to the present disclosure is not limited. For example, various refrigerants can be produced by known production methods. HFO-1132(E/Z) for use as a refrigerant can be produced by a dehydrofluorination reaction of 1,1,2-trifluoroethane (HFC-143), a hydrogenation reaction of (E) and/or (Z)-1,2-dichloro-1,2-difluoroethylene (CFO-1112(E/Z)), or a dehydrochlorination reaction of 1-chloro-1,2-difluoroethane (HCFC-142a).

The refrigerant content in the composition can be determined by gas chromatography.

In the composition according to the present disclosure, the refrigerant content is preferably 50 mass % or more, more preferably 60 mass % or more, even more preferably 70 mass % or more, particularly preferably 80 mass % or more, and most preferably 90 mass % or more. In the composition according to the present disclosure, the refrigerant content may be 99 mass % or more.

In one embodiment, the refrigerant contained in the composition preferably consists substantially of at least one component selected from the group consisting of HFO-1234yf, HFO-1132(E/Z), HFC-1132a, HFO-1123, and FO-1114.

The refrigerant contained in the composition may comprise a compound other than at least one component selected from the group consisting of HFO-1234yf, HFO-1132(E/Z), HFO-1132a, HFO-1123, and FO-1114.

For example, impurities that can possibly be mixed during the production of the refrigerants (unavoidable impurities) may be contained.

For example, in terms of HFC-1132(E/Z), examples of the impurities include hydrogen fluoride, fluoroethylene, HFO-1123, 1,1,1-trifluoroethane, propylene, acetylene, difluoromethane (HFC-32), trifluoromethane, fluoromethane, HFO-1123, 1,1-difluoroethane (HFC-152a), fluoroethane (HFC-161), 1,1,2-trifluoroethane (HFC-143), 2-chloro-1,1,1-trifluoroethane (HCFC-133b), 1-chloro-1,1,2-trifluoroethane (HCFC-133), 1,1-dichloro-2,2,2-trifluoroethane (HCFC-123), 1-chloro-1,2-difluoroethane (HCFC-142a), 1,2-difluoroethane (HFC-152), chlorodifluoromethane (HCFC-22), 1,1,1,2-tetrafluoroethane (HFC-134a), 1,1,2,2-tetrafluoroethane (HFC-134), pentafluoroethane (HFC-125), UFO-1234yf, 1,2,3,3,3-pentafluoropropene (HFO-1225ye), 1,3,3,3-tetrafluoropropene (HFC-1234ze), 1,3,3,3-tetrafluoropropene (HFO-1234ze), fluoroethylene (HFO-1141), 3,3,3-trifluoropropene (HFO-1243zf), 1,1-difluoroethylene (HFO-1132a), 1-chloro-2,2-difluoroethylene (HCFO-1122), 1-chloro-1,2-difluoroethylene (HCFO-1122a), ethylene, and the like.

When the refrigerant in the composition contains impurities of the refrigerant, the content of the impurities is not limited and may be, for example, about 0.1 ppm or more and 10,000 ppm or less on a weight basis. Within this range, the stabilizing effect on the refrigerant in the composition is less likely to be interfered with.

(2) Carbon

The composition according to the present disclosure contains carbon.

The composition according to the present disclosure preferably contains 1 ppm or more of carbon, on a weight basis, based on the refrigerant.

The phrase "containing 1 ppm or more of carbon, on a weight basis, based on the refrigerant" in the composition according to the present disclosure means, for example, that when the composition contains a refrigerant, the composition contains 1 mg or more of carbon per kilogram of the refrigerant (one millionth or more on a weight basis).

In the composition according to the present disclosure, carbon is one of the components that constitute the composition.

Refrigerants such as HFO-1234yf, HFO-1132(E/Z), HFO-1132a, HFO-1123, and FO-1114 have unsaturated bonds and therefore may not have good stability in some cases. For example, with the lapse of time, decomposition and oxidation may occur, which generates acid and possibly affects the air-conditioning cycle. The composition according to the present disclosure contains a refrigerant described above and also contains carbon (i.e., carbon is present with the refrigerant), thereby effectively suppressing the decomposition and oxidation of the refrigerant.

The carbon is preferably carbon particles. The type of carbon particles is not limited and the carbon particle is preferably at least one particle selected from the group consisting of carbon fibers, carbon nanotubes, graphene, graphite (natural graphite particles and artificial graphite particles), and amorphous carbon.

Preferable examples of carbon fibers include PAN-based carbon fibers (carbon fibers produced using acrylic fibers) and pitch-based carbon fibers (carbon fibers produced using pitch (e.g., a by-product such as petroleum, coal, or coal tar).

Preferable examples of carbon nanotubes include single-walled carbon nanotubes, multi-walled carbon nanotubes, and vapor-grown carbon fibers (VGCFs).

Preferable examples of graphene include single-layer graphene and multilayer graphene.

Preferable examples of graphite include natural graphite grains, such as highly thermally conductive scale graphite particles and other scale graphite particles.

Preferable examples of graphite include artificial graphite particles. Specific examples include isotropic graphite particles, anisotropic graphite particles, and pyrolytic graphite particles.

Preferable examples of amorphous carbons include non-graphitizable carbon, graphitizable carbon, carbon black, and activated carbon.

The size of the carbon particles is not limited. When carbon fibers are used as carbon particles, short carbon fibers with an average carbon length of about 10 μm or more and about 2 mm or less are preferably used. When carbon nanotubes are used as carbon fibers, carbon nanotubes with an average length of about 1 μm or more and about 10 μm or less are used. When graphite (natural graphite particles and/or artificial graphite particles) is used as carbon fibers, graphite (natural graphite particles and/or artificial graphite particles) with an average length of about 10 μm or more and about 3 mm or less in the longest axial direction is preferably used.

The size of the carbon particles is preferably 10 nm or more when carbon black is used as amorphous carbon.

The composition according to the present disclosure preferably contains 1 ppm or more of carbon, on a weight basis, based on (relative to, or in) the refrigerant. Since the composition according to the present disclosure contains carbon, the refrigerant in the composition has increased stability. The carbon content in the composition according to the present disclosure is more preferably 10 ppm or more, even more preferably 20 ppm or more, particularly preferably 30 ppm or more, and most preferably 40 ppm or more, on a weight basis, based on the refrigerant.

The composition according to the present disclosure preferably contains 10,000 ppm or less of carbon, on a weight basis, based on (relative to, or in) the refrigerant. The upper limit of the carbon content in the composition according to the present disclosure is preferably set to 10000 ppm, based on the refrigerant, whereby clogging in an apparatus, such as a refrigerating machine, can be suppressed. The carbon content in the composition according to the present disclosure is preferably 5000 ppm or less, more preferably 1000 ppm or less, and even more preferably 500 ppm or less, on a weight basis, based on the refrigerant.

The carbon content in the composition according to the present disclosure is adjusted to 1 ppm or more and 10,000 ppm or less, on a weight basis, based on the refrigerant, whereby acid generation due to decomposition, oxidation, etc. is suppressed, thus increasing the stability of the refrigerant.

The carbon content in the composition according to the present disclosure, based on the refrigerant, can be measured with a commercially available analytical balance. The detection limit is usually 0.01 ppm on a weight basis. When the carbon content is measured with a commercially available analytical balance (a precision balance), it is possible to measure down to 0.01 mg. For example, when 1 kg of a refrigerant in a composition is measured, the detection limit is 0.01 ppm (10 ppb).

(3) Water

The composition according to the present disclosure preferably further contains water.

The composition according to the present disclosure preferably contains 10 ppm or more of water, on a weight basis, in the composition. The composition according to the present disclosure preferably contains 100 ppm or less of water, on a weight basis, in the composition.

In the composition according to the present disclosure, the phrase "contains 10 ppm or more of water, on a weight basis, in the composition" means that, for example, 1 kg of the composition (whole) contains more than 10 mg (ten millionths or more on a weight basis) of water.

Since the composition according to the present disclosure contains water, the stability of the refrigerant in the composition can be increased due to a synergistic effect provided by the presence of carbon with water. In particular, when the water content in the composition according to the present disclosure is adjusted to 10 ppm or more and 100 ppm or less, on a weight basis, the generation of acid due to decomposition, oxidation, etc. can be more effectively suppressed by a synergistic effect of the presence of carbon with water, thus further increasing the stability of the refrigerant.

The water content in the composition according to the present disclosure is preferably 10 ppm or more, more preferably 20 ppm or more, even more preferably 30 ppm or more, and particularly preferably 40 ppm or more, on a weight basis. The water content in the composition is preferably 100 ppm or less, more preferably 90 pm or less, even more preferably 80 ppm or less, and particularly preferably 70 ppm or less, on a weight basis.

By adjusting the water content in the composition according to the present disclosure, the stability of the refrigerant can be increased due to a synergistic effect of the water content and carbon content, thus suppressing the generation of acid etc.

The water content in the composition according to the present disclosure can be measured with a commercially available Karl Fischer moisture measuring device, and the detection limit is usually 0.1 ppm on a weight basis.

Since the composition according to the present disclosure contains the refrigerant, carbon, and water, the stability of the refrigerant is increased and the generation of acid etc. is suppressed even after long-term storage.

Although no limited interpretation is desired, the following mechanism can be considered to be a reason why water enhances the stability of the refrigerant. First, water that is present in the composition reacts with or stabilizes fluorine-containing methyl radicals or fluorine-containing ethyl radicals generated in the initial stage of decomposition of the refrigerant. This makes a reaction between the refrigerant and the radicals generated in the initial stage of decomposition less prone to occur, or reduces the reaction rate, which makes chain reactions less prone to occur, and also makes oxidation, etc. less prone to occur, thus enhancing the stability of the refrigerant.

On the other hand, if the water content exceeds a certain level (for example, if the water content is 10 ppm or more on a weight basis), the refrigerant and the fluorine-containing methyl radicals or fluorine-containing ethyl radicals dissolve into water, the concentration of the radicals becomes locally high, and the water forms a reaction field. This makes a polymerization reaction of the refrigerant occur, and the refrigerant is thus more prone to be consumed, thus causing a reduction in stability of the refrigerant, as well as causing the formation of agglomerates resulting from the polymerization reaction.

(4) Other Components in the Composition

The composition may further contain at least one other component in addition to the refrigerant, carbon, and water. The other component is, for example, at least one member selected from the group consisting of tracers, air, impurities, and by-products.

The content of the other component in the composition is preferably 0.01 mass % or more, based on the entire composition on a mass basis. The content of the other component in the composition is preferably 1 mass % or less, and more preferably 0.1 mass % or less, based on the entire composition on a mass basis.

(5) Refrigeration Oil-Containing Working Fluid

The composition according to the present disclosure contains the refrigerant and carbon, and contains water if necessary. Preferably, the composition according to the present disclosure further contains refrigeration oil and is used as a working fluid (refrigeration oil-containing working fluid) in a refrigerating machine.

Specifically, the refrigeration oil-containing working fluid is obtained by mixing refrigeration oil for use in the compressor of a refrigerating machine with a refrigerant or a refrigerant composition.

The refrigeration oil-containing working fluid changes its formulation during the refrigeration cycle. Specifically, the refrigeration oil content in the refrigeration oil-containing working fluid is relatively high in the compressor and relatively low during the period when the working fluid is discharged in the form of a mist from the compressor, circulates through the refrigeration cycle, and returns to the compressor.

The refrigeration oil content in the refrigeration oil-containing working fluid is preferably 30 mass % or more and 70 mass % or less in the compressor.

The refrigeration oil content in the refrigeration oil-containing working fluid during the period when the working fluid is discharged from the compressor and returns to the compressor is preferably 1 mass ppm or more and 20 mass % or less, and more preferably 10 mass %.

The base oil of the refrigeration oil is preferably a lubricating oil. The lubricating oil is not limited. For example, known lubricating oils used for refrigerants etc. can be widely used.

Specific examples of lubricating oil include at least one lubricating oil selected from the group consisting of polyalkylene glycols (PAG), polyol esters (POE), and polyvinyl ethers (PVE). Examples of polyalkylene glycol (PAG) include SUNICE P56, produced by Japan Sun Oil Company, Ltd. Examples of polyol ester (POE) include Ze-GLES RB32, produced by JX Nippon Oil & Energy Corporation.

The refrigeration oil preferably further contains at least one additive in addition to the base oil. The additive is preferably at least one component selected from the group consisting of compatibilizing agents, ultraviolet fluorescent dyes, stabilizers, polymerization inhibitors, antioxidants, extreme-pressure agents, acid scavengers, oxygen scavengers, copper deactivators, anticorrosive agents, oily agents, and antifoaming agents.

(6) Methods for Preparing the Composition and Refrigeration Oil-Containing Working Fluid The methods for preparing the composition and refrigeration oil-containing working fluid according to the present disclosure are not limited.

The method for preparing the composition and refrigeration oil-containing working fluid are preferably a method comprising mixing the refrigerant and carbon black, optionally with water and preferably further with refrigeration oil etc. in predetermined proportions. In mixing these components, other additives can also be appropriately added.

In the production of the refrigerant, which is to be incorporated into the composition and refrigeration oil-containing working fluid according to the present disclosure, water may be present with the refrigerant. When the composition according to the present disclosure is to be produced from such a refrigerant, carbon is incorporated and, for example, (1) the water and the refrigerant can be mixed to prepare the composition, (2) the amount of water can be maintained to prepare the composition, or (3) the amount of water can be reduced to prepare the composition. The method of reducing the amount of water in the composition is not limited, and widely known methods can be used. A preferred method is a drying method using an adsorbent.

In the production of the refrigerant, which is to be incorporated into the composition according to the present disclosure, impurities may be present with the refrigerant. After removing the impurities beforehand by an appropriate method, the composition can be produced. Alternatively, without removing the impurities, the refrigerant can be used as is in order to produce the composition.

[2] Method for Stabilizing Composition

The present disclosure includes a method for stabilizing a composition comprising the refrigerant.

In the method for stabilizing a composition comprising the refrigerant according to the present disclosure, the refrigerant is at least one compound represented by a molecular formula containing at least one carbon-carbon unsaturated bond, the method comprising incorporating carbon into the composition.

In the method for stabilizing a composition comprising the refrigerant according to the present disclosure, the refrigerant is preferably at least one member selected from the group consisting of HFO-1234yf, HFO-1132(E/Z), HFO-1132a, HFO-1123, and FO-1114.

The amount of carbon to be present in the refrigerant is preferably 1 ppm or more, on a weight basis, based on (relative to, or in) the refrigerant.

According to the method for stabilizing a composition containing the refrigerant according to the present disclosure, carbon is present with at least one component selected from the group consisting of HFO-1234yf, HFO-1132(E/Z), HFO-1132a, HFO-1123, and FO-1114 as a refrigerant, whereby the decomposition and oxidation of the refrigerant can be effectively suppressed, thus increasing the stability of the refrigerant.

The method according to the present disclosure further comprises incorporating water into the composition. The amount of water to be incorporated into the composition is preferably 10 ppm or more on a weight basis.

According to the method for stabilizing a composition containing the refrigerant according to the present disclosure, the water that is present in the composition makes chain reactions of decomposition of the refrigerant less prone to occur, and also makes oxidation etc. less prone to occur, thus increasing the stability of the refrigerant.

The method for stabilizing a composition containing the refrigerant according to the present disclosure is preferably a method for stabilizing a refrigeration oil-containing working fluid, the method further comprising incorporating refrigeration oil into the composition.

The components used in the method of stabilizing the composition according to the present disclosure, such as a refrigerant and refrigeration oil, can be, for example, those described above in the sections on the composition and on a thermal cycle system.

The present disclosure includes the embodiments described in the following Items.

Item 1.

A composition comprising a refrigerant and carbon, the refrigerant comprising at least one compound represented by a molecular formula containing at least one carbon-carbon unsaturated bond.

Item 2.

The composition according to Item 1, wherein the refrigerant comprises at least one member selected from the group consisting of 2,3,3,3-tetrafluoropropene (HFO-1234yf), trans-1,2-difluoroethylene (HFO-1132(3)), cis-1,2-difluoroethylene (HFO-1132(Z)), 1,1-difluoroethylene (HFO-1132a), trifluoroethylene (HFO-1123), and tetrafluoroethylene (FO-1114).

Item 3.

The composition according to Item 1 or 2, wherein the composition comprises 1 ppm or more of the carbon on a weight basis, based on (relative to, or in) the refrigerant.

Item 4.

The composition according to any one of Items 1 to 3, further comprising water.

Item 5.

The composition according to item 4, wherein the composition comprises 10 ppm or more of the water on a weight basis.

Item 6.

The composition according to any one of Items 1 to 5, which is for use as a refrigeration oil-containing working fluid, the composition further comprising a refrigeration oil.

Item 7.

A method for stabilizing a composition comprising a refrigerant, the refrigerant comprising at least one compound represented by a molecular formula containing at least one carbon-carbon unsaturated bond, the method comprising incorporating carbon into the composition.

Item 8.

The method according to Item 7, wherein the refrigerant is at least one component selected from the group consisting of 2,3,3,3-tetrafluoropropene (HFO-1234yf), trans-1,2-difluoroethylene (HFO-1132(E)), cis-1,2-difluoroethylene (HFO-1132(Z)), 1,1-difluoroethylene (HFO-1132a), trifluoroethylene (HFO-1123), and tetrafluoroethylene (FO-1114).

Item 9.

The method according to Item 7 or 8, wherein 1 ppm or more of the carbon on a weight basis is incorporated based on (relative to, or in) the refrigerant.

Item 10.

The method according to any one of Items 7 to 9, further comprising incorporating water into the composition.

Item 11.

The method according to Item 10, wherein 10 ppm or more of the water on a weight basis is incorporated into the composition.

Examples

The following Examples describe the present disclosure in more detail. However, the present disclosure is not limited to the embodiments of the Examples.

(1) Preparation of Composition

Trans-1,2-difluoroethylene (HFO-1132(E)) was prepared by subjecting 1,1,2-trifluoroethane (HFC-143) to dehydrofluorination.

Trifluoroethylene (HFO-1123) was prepared by subjecting chlorotrifluoroethylene to hydrogen reduction.

Carbon black and water were mixed with a refrigerant not containing water (HFO-1132(E) or HFO-1123) to prepare a composition containing the refrigerant, carbon (1 ppm in the composition on a weight basis, based on the refrigerant), and water (10 ppm in the composition, on a weight basis).

Compositions containing a refrigerant and carbon were prepared in the Examples.

Compositions containing a refrigerant but not containing carbon were prepared in the Comparative Examples.

(2) Method of Stability Test

The compositions obtained in the Examples and Comparative Examples were subjected to a stability test in the following manner.

Each of the compositions was placed in a glass tube (inner diameter: 8 mm; outer diameter: 12 mm; length: 300 mm) with one side sealed by fusing in an amount such that the refrigerant content was 0.01 mol. The tube was hermetically sealed by fusing. The tube was allowed to stand in a constant-temperature bath in an atmosphere at 175° C. and kept in this state for 2 weeks. This tube was then removed from the constant-temperature bath and cooled. The acid in the gas inside the tube was analyzed to evaluate the stability of the composition.

In the refrigerant stability test, the analysis of acid in the gas was performed by the following method.

Gas remaining in the tube after cooling was completely solidified using liquid nitrogen. The tube was then opened and gradually thawed to collect gas into a Tedlar bag. Five grams of pure water was injected into the Tedlar bag to extract acid into the pure water while efficiently bringing pure water into contact with the collected gas. The extract was subjected to ion chromatography for detection to determine the fluoride ion ($F^-$) content (mass ppm).

(3) Results of Stability Test

Table 1 shows the result of the refrigerant stability test.

TABLE 1

| | Composition | Acid value after stability test 175° C., 3 MPa, sealed glass tube (shield tube) |
|---|---|---|
| Comparative Example 1 | HFO-1132(E) alone | 100 mass ppm |
| Reference Example 1 | HFO-1132(E) + a trace of moisture | 50 mass ppm |
| Comparative Example 2 | HFO-1123 alone | 100 mass ppm |
| Reference Example 2 | HFO-1123 + a trace of moisture | 50 mass ppm |
| Example 1 | HFO-1132(E) + carbon | 20 mass ppm |
| Example 2 | HFO-1132(E) + carbon + a trace of moisture | <1 mass ppm |
| Example 3 | HFO-1123 + carbon | 20 mass ppm |
| Example 4 | HFO-1123 + carbon + a trace of moisture | <1 mass ppm |

In all the compositions of Examples 1 to 4, in which carbon was present with a refrigerant, the generation of acid was suppressed and the compositions can thus be evaluated as keeping the refrigerant stable. In particular, even in the compositions of Examples 2 and 4, which contained water, based on the presence of carbon with the refrigerant, generation of acid is more effectively suppressed in both the Examples, and the compositions obtained in these Examples can be evaluated as keeping the refrigerant more stable.

The compositions of Examples 1 to 4 can be evaluated as being less prone to decomposition of the refrigerant.

In the compositions of Comparative Examples 1 and 2, in which carbon was not present with the refrigerant, a large amount of acid was generated. These compositions can be evaluated as being prone to decomposition of the refrigerant.

In the compositions of Reference Examples 1 and 2, which contained water, acid was generated due to the absence of carbon with the refrigerant. These compositions can be evaluated as being prone to decomposition of the refrigerant.

It can be concluded from the stability test results that the presence of carbon with a refrigerant, such as HFO-1132(E) or HFO-1123, in the composition stabilizes the refrigerant.

This suggests that the compositions of the Examples, which contained a refrigerant and carbon, preferably further contain refrigeration oil and can be used as working fluids containing the compositions and refrigeration oil (refrigeration oil-containing working fluids) in a refrigerating machine.

The invention claimed is:

1. A composition comprising a refrigerant and carbon, the refrigerant comprising at least one member selected from the group consisting of trans-1,2-difluoroethylene (HFO-1132(E)), cis-1,2-difluoroethylene (HFO-1132 (Z)), 1,1-difluoroethylene (HFO-1132a), trifluoroethylene (HFO-1123), and tetrafluoroethylene (FO-1114), and the carbon is at least one particle selected from the group consisting of carbon fibers, carbon nanotubes, graphene, and amorphous carbon.

2. The composition according to claim 1, wherein the composition comprises 1 ppm or more of the carbon on a weight basis, based on the refrigerant.

3. The composition according to claim 1, further comprising 10 ppm to 100 ppm of water on a weight basis.

4. The composition according to claim 1, which is for use as a refrigeration oil-containing working fluid, the composition further comprising a refrigeration oil.

5. A method for stabilizing a composition comprising a refrigerant, the refrigerant comprising at least one member selected from the group consisting of trans-1,2-difluoroethylene (HFO-1132(E)), cis-1,2-difluoroethylene (HFO-1132 (Z)), 1,1-difluoroethylene (HFO-1132a), trifluoroethylene (HFO-1123), and tetrafluoroethylene (FO-1114), and the method comprising incorporating carbon into the composition, the carbon is at least one particle selected from the group consisting of carbon fibers, carbon nanotubes, graphene, and amorphous carbon.

6. The method according to claim 5, wherein 1 ppm or more of the carbon on a weight basis is incorporated based on the refrigerant.

7. The method according to claim 5, further comprising incorporating water into the composition, wherein 10 ppm or more, and 100 ppm or less of the water on a weight basis is incorporated into the composition.

* * * * *